United States Patent [19]
Van Wuytswinkel

[11] 3,963,278
[45] June 15, 1976

[54] TRACK ROLLER FRAME AND FINAL CASE MOUNTING

[75] Inventor: Charles M. G. Van Wuytswinkel, Thimeon, Belgium

[73] Assignee: Caterpillar Tractor Co., Peoria, Ill.

[22] Filed: Jan. 23, 1975

[21] Appl. No.: 543,574

[52] U.S. Cl. .............................. 305/12; 180/9.2 R
[51] Int. Cl.² ........................................... B60S 1/62
[58] Field of Search .............. 180/9.2 R, 6.48, 6.7, 180/70 P, 82 R; 305/11, 12

[56] References Cited
UNITED STATES PATENTS

| | | | |
|---|---|---|---|
| 2,146,882 | 2/1939 | Baker | 305/12 |
| 2,900,210 | 8/1959 | Parsons | 305/12 |
| 3,773,128 | 11/1973 | Bowen | 180/6.48 |
| 3,861,762 | 1/1975 | Freedy | 305/12 |
| 3,872,939 | 3/1975 | Eckert | 180/6.48 |

*Primary Examiner*—Philip Goodman
*Assistant Examiner*—John A. Carroll
*Attorney, Agent, or Firm*—Phillips, Moore, Weissenberger, Lempio & Strabala

[57] ABSTRACT

In a track-type vehicle adapted for movement along a longitudinal axis thereof which comprises a track roller frame having a pair of laterally spaced outer and inner rails, a track which moves over said frame and about a sprocket and a final drive within a housing adjacent said sprocket, the improvement of protecting the final drive housing and the sprocket from accumulation of dirt and providing a mounting for the final drive housing. The improvement is accomplished utilizing a structure comprising a guard member secured to a rearward end of said rails to protect and reduce accumulation of dirt on said final drive housing and said sprocket and mounting means for securing said housing to said guard member.

5 Claims, 6 Drawing Figures

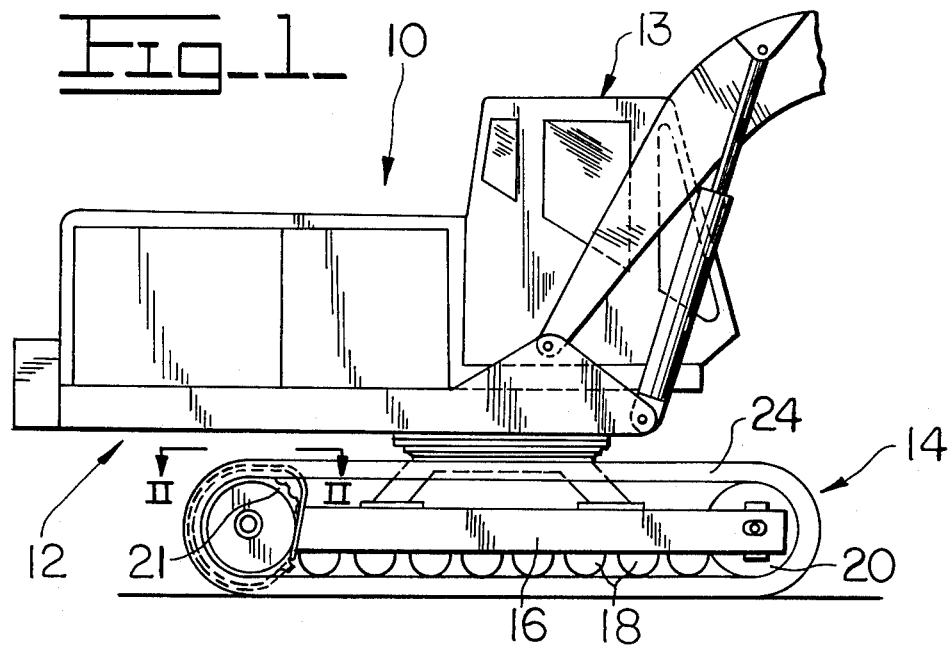
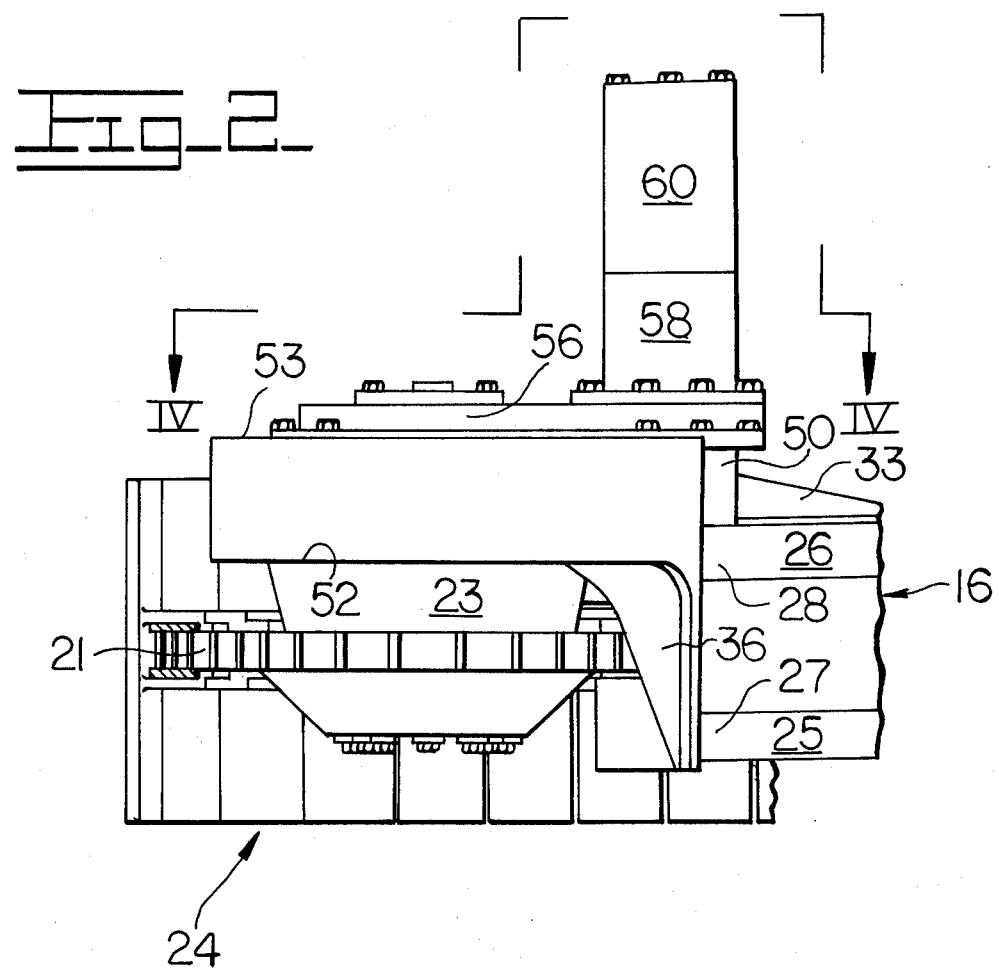

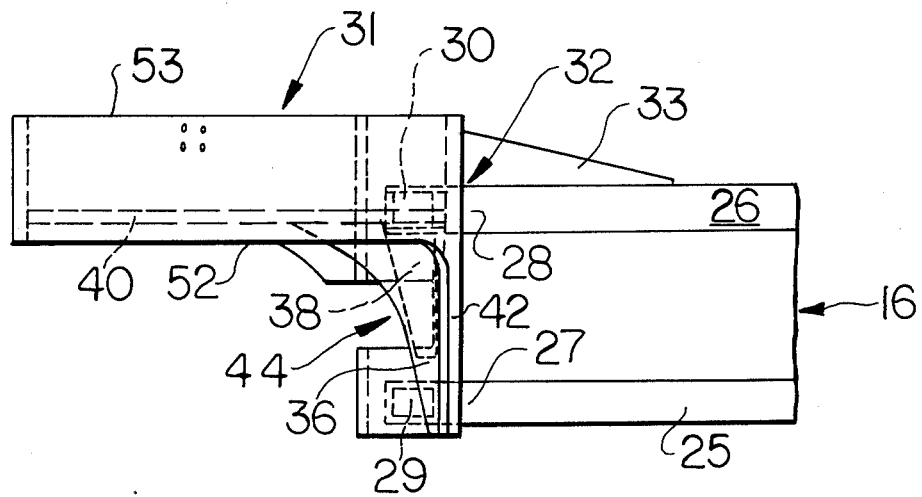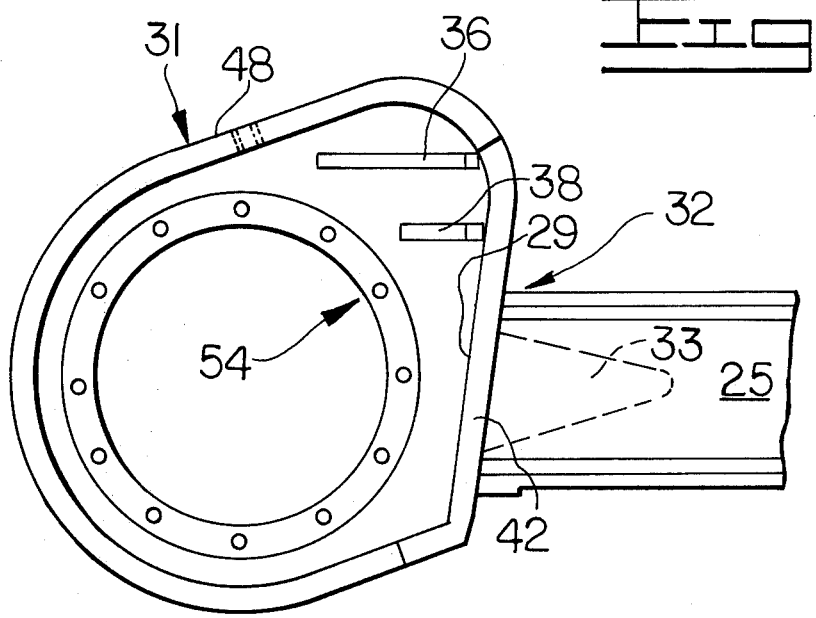

TRACK ROLLER FRAME AND FINAL CASE MOUNTING

BACKGROUND OF THE INVENTION

The invention relates to a combination mounting for a final drive case and guard assembly for protecting the final drive case and sprocket and to prevent accumulation of dirt and/or other objects between the track, sprocket and final drive case of the track-type vehicle.

PRIOR ART

On track-type machines such as hydraulic excavators the two final drive housings containing the drive gear train are detachably mounted or flexably secured, one to each of the track roller frames of the machine. Prior art methods for accomplishing this are quite costly and complicated, especially for use on a small machine. In addition, packing of mud and the like in and around the final drive housing and drive sprocket tends to reduce the life expectancy of components closely associated therewith such as track rollers, sprockets, track chains and the like.

Accordingly, it is an object of the present invention to provide an improvement for protecting the final drive housing and sprocket of a track-type vehicle from accumulation of dirt in combination with means for securing the housing of the final drive of the vehicle to a guard member which accomplishes the protection of the final drive housing and the sprocket.

SUMMARY OF THE INVENTION

Briefly, the invention comprises an improvement in a track-type vehicle adapted for movement along a longitudinal axis thereof. Such a vehicle comprises two track roller frames each having a pair of laterally spaced outer and inner rails, a track which moves over the frame, a sprocket with an associated sprocket shaft cover and a final drive having a housing therefor. The improvement comprises mounting the final drive housing to the frame while protecting it and the sprocket from accumulation of dirt. The improvement if accomplished by a guard member secured to a rearward end of said rails to protect and reduce accumulation of dirt on said final drive housing and on said track and mounting means on said guard member for securing said housing thereto.

DESCRIPTION OF THE DRAWINGS

For a better understanding of the invention, reference may be made to the drawings wherein:

FIG. 1 illustrates in side-elevation view a hydraulic excavator utilizing the improvement of the present invention;

FIG. 2 illustrates in partial top view taken along line II—II of FIG. 1, with the top portion of the chain assembly deleted, the final drive housing and track roller frame of the hydraulic excavator;

FIG. 5 illustrates the track roller frame and guard assembly in a partial top view; and FIG. 6 is a side view of FIG. 5.

DETAILED DESCRIPTION OF THE PREFERRED EMBODIMENTS

Figure 3:
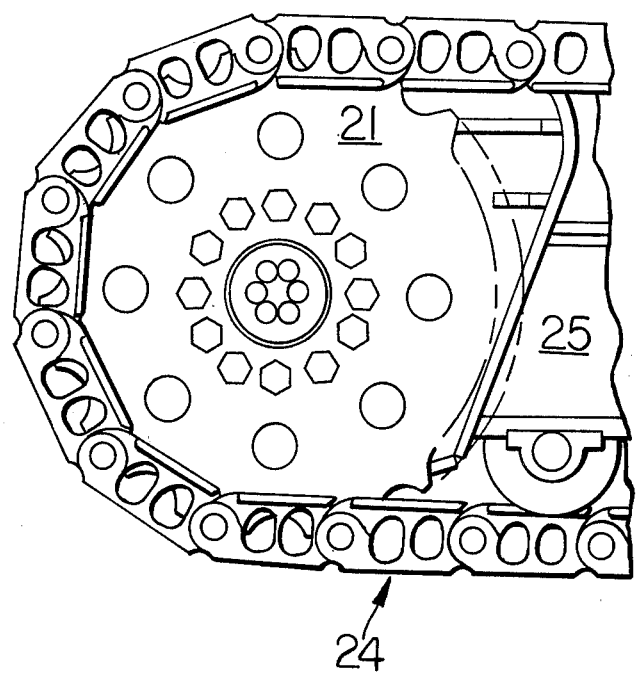
FIG. 3 illustrates the final drive housing and track roller frame in an enlarged partial outside view.
Figure 4:
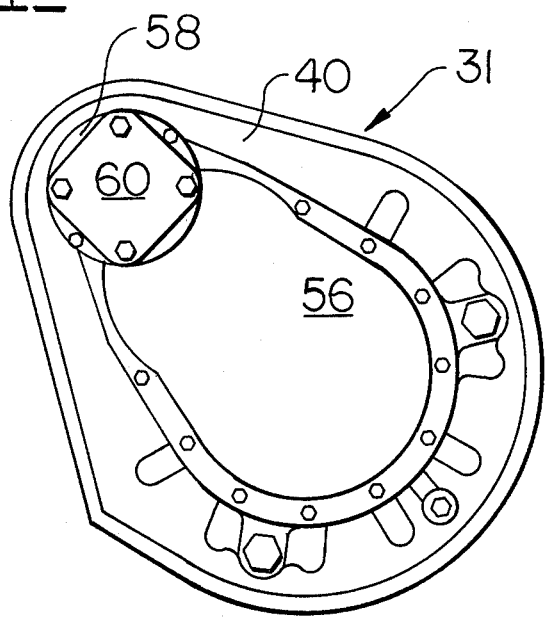
FIG. 4 illustrates the final drive case in an enlarged partial inside view.

In FIG. 1 an excavator machine 10 is illustrated having an upper section 12, including a cab 13, swingably mounted on a ground traversing section 14. The ground traversing section comprises a track roller frame assembly 16, a plurality of track rollers 18, an idler 20, a sprocket 21, a sprocket shaft cover 23, and a chain assembly 24 having track shoes mounted thereto. On the other side of the excavator machine is a second ground traversing section 14.

The track roller frame assembly 16 as may be seen most clearly by reference to FIG. 2 comprises a pair of side rails, namely an outer side rail 25 and an inner side rail 26. The rear ends 27 and 28, respectively, of the outer and inner side rails end in the ramps 29 and 30, respectively. A guard assembly 31 of the present invention, as illustrated, is welded to the track roller frame assembly where the ramps 29 and 30 abut the guard assembly generally at 32.

A support, in particular a gusset 33, is utilized to reinforce the connection between the guard assembly 31 and the track roller frame assembly 16. The gusset 33 is welded to the inner side rail on the inner side 34 tereof. The guard assembly is further reinforced with gussets 36 and 38 which provide extra strength therefor. The gussets 36 and 38 are each welded along one edge thereof to a flange 40 and along another edge thereof to an arcuate sprocket-protecting wrap around wall 42 which completely encompasses flange 40. Thus, triangular bracing is provided for the wall 42. This is desirable since significant bending of the wall 42 could lead to its interfering with the motion of the sprocket 21 through the cut-out portion 44 of wall 42. Also, the gussets 36 and 38 along with the wall 42 provide protection for the sprocket against rocks and dirt.

The guard assembly 31 further comprises a sleeve portion 48 axially disposed about a final drive housing 50 with the flange 40 extending from adjacent one end 52 of the sleeve inwardly, radially. Thus, the other end 53 of the sleeve provides full protection against rocks and dirt for the final drive housing. A mounting means, in particular a bolt circle 54 (FIG. 6), comprising a plurality of holes through the flange 40 serves in combination with a plurality of screw threaded members, to detachably secure the final drive housing to the flange of the guard assembly and through the guard assembly to the sprocket shaft cover 23. A cover 56 encloses the gears housed in the final drive housing and a brake assembly 58 and motor 60 are secured to the cover.

Thus, the final drive housing 50 is protected on its one side by the cover 56, on its other side by the flange 40 of the guard assembly 31 and about its periphery by the sleeve 48. The wall 42 and the gussets 36 and 38 serve to protect the sprocket 21. The flange also provides the means for mounting the final drive housing to the track roller frame assembly 16. The gussets 33, 36 and 38 provide the necessary rigidity for heavy duty operation.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In track-type vehicle adapted for movement along a longitudinal axis thereof, which comprises a track roller frame having a pair of laterally spaced outer and inner rails, a track which moves over said frame, a sprocket, a sprocket shaft cover and a final drive having a housing, the improvement of mounting the final drive housing while protecting it and the sprocket from accumulation of dirt, comprising:

a guard member secured to a rearward end of said rails and including a sleeve extending rearwardly from the rearward end of the inner of said rails and a support secured to said sleeve and to an inner side of said inner rail, said sleeve being axially disposed about said housing to protect and reduce accumulation of dirt on said final drive housing and on said track; and a flange extending from adjacent the periphery of one side of said sleeve inwardly radially secured between said sprocket shaft cover and said final drive housing, said flange serving to secure said housing to said guard member.

2. An improvement as in claim 1, wherein said housing is detachably securable to said flange.

3. An improvement as in claim 2, wherein said guard member includes an arcuate sprocket-protecting wall extending from said one side of said sleeve and being secured to a rearward end of said outer rail, said wall including a cut-out portion therethrough which said sprocket passes.

4. An improvement as in claim 3, including a pair of gussets, each attached to said flange and to said wall to increase the rigidity of said guard member.

5. An improvement as in claim 4, wherein said vehicle comprises a hydraulic excavator.

* * * * *